United States Patent [19]

Filho

[11] 4,424,876
[45] Jan. 10, 1984

[54] PNEUMATIC SPEED LIMITER FOR VEHICLES

[75] Inventor: Angelo I. Filho, Sao Caetano do Sul, Brazil

[73] Assignee: Mercedes-Benz Do Brasil S/A, Brazil

[21] Appl. No.: 296,393

[22] Filed: Aug. 26, 1981

[30] Foreign Application Priority Data

Aug. 12, 1981 [BR] Brazil ................................ 8005622

[51] Int. Cl.³ ...................... B60K 31/00; F02D 31/00
[52] U.S. Cl. .................................... 180/175; 123/330; 123/332
[58] Field of Search ............... 123/319, 332, 333, 330, 123/331; 180/175-179

[56] References Cited

U.S. PATENT DOCUMENTS 3,020,969 2/1962 Von Berg et al. ................. 180/175
4,072,207 2/1978 Kokubo .............................. 180/175

Primary Examiner—William A. Cuchlinski, Jr.
Attorney, Agent, or Firm—Beveridge, DeGrandi and Kline

[57] ABSTRACT

A speed limiting device for vehicles is described in which an actuator is responsive to a vehicle speed sensor to reduce air and fuel supplies to the vehicle engine when a predetermined vehicle speed is reached. The possibility of the vehicle driver overriding the device from the driver's position is eliminated by making electrical connections to supply power for the device direct to the vehicle's battery, and by inserting in the accelerator pedal linkage an compressible elastic strut which limits the force exertable on the throttle linkage by the driver.

13 Claims, 1 Drawing Figure

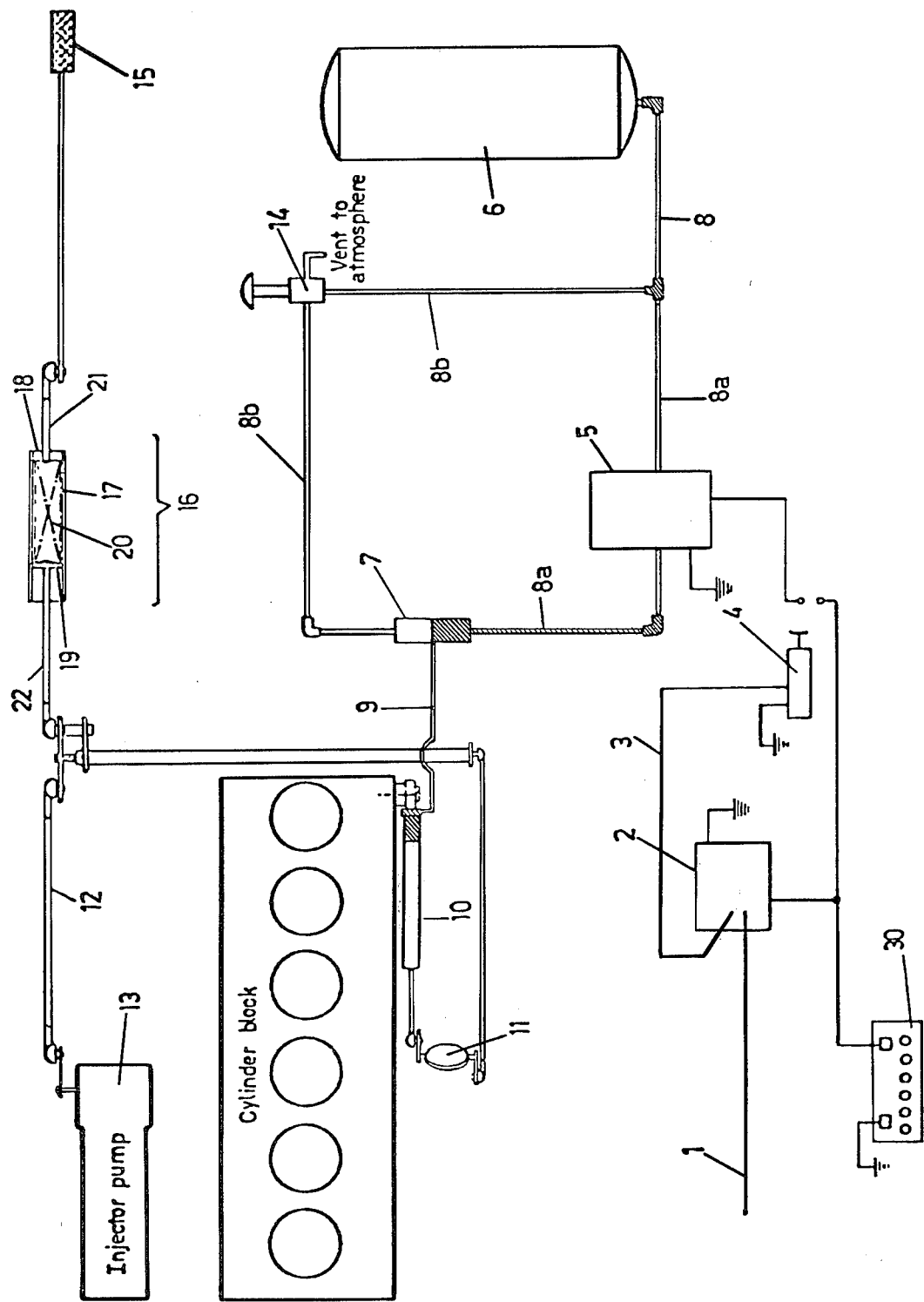

PNEUMATIC SPEED LIMITER FOR VEHICLES

The present invention relates to a pneumatic speed limiter for vehicles, especially for urban omnibuses, lorries and the like. The necessity for such a speed limiting device, which acts positively to limit the vehicles speed, is well accepted. The devices will act independently of the vehicle's driver or of external influences. This limitation in speed is a significant factor in increasing road safety, particularly in city traffic.

Of existing devices, the majority act to produce an engine braking effect when the predetermined speed is reached. These devices are not proof against interference from the driver, which occurs with some frequency. Such interference typically takes the form of disconnecting the ignition switch of the vehicle (it being known that diesel engines will continue to run in this state) or by exerting heavy pressure on the accelerator pedal to overcome the action of the limiter, which is to push the accelerator pedal from below to close the throttle.

The object of the present invention is to provide a vehicle speed limiter which overcomes the problems of the prior art.

According to an aspect of the present invention, a vehicle speed limiter is provided which at a predetermined speed acts to close the engine throttle valve to prevent the said speed from being exceeded, the device comprising an angular velocity sensor responsive to the angular velocity of the vehicle's speedometer cable which, when the predetermined speed is reached, actuates an electropneumatic valve to operate a pneumatic actuator connected to the throttle linkage in such a way as to close the throttle, a relay means being connected between the sensor and the electropneumatic valve to maintain the valve continuously supplied with electricity by means of a direct connection to the vehicle's battery.

Another aspect of the invention is the provision of an elastic linkage between the accelerator pedal and the remainder of the throttle linkage, the elastic link being so disposed and arranged that the maximum force exertable on the linkage by means of the pedal is insufficient to overcome the effort exerted by the pneumatic cylinder mentioned above.

A speed limiting device according to the present invention will now be described in detail, with reference to the accompanying drawing, in which is shown schematically a vehicle throttle linkage with the speed limiting device attached.

In the drawings, a speedometer cable 1 is seen connected to an angular velocity sensor 2, which detects rotation of the speedometer cable. The sensor 2 is adjusted to emit a signal when the rotational speed of the cable 1 corresponds to the maximum permitted vehicle speed. An electrical connection 3 joins sensor 2 to a relay 4, the relay 4 controlling the action of a valve 5 in a manner to be described.

A compressed air reservoir 6, fed by the vehicle's compressor, supplies pressurized air to a line 8 which branchs into two lines 8a, 8b. Line 8a passes to electropneumatic valve 5 and thence to a two-way valve 7. Line 8b is connected to a pedal valve 14, and thence to the two-way valve 7. From two-way valve 7 an air line runs to a pneumatic acutator 10.

The pneumatic actuator 10 is mounted so that, when supplied with compressed air, it extends and acts on the vehicle throttle linkage to close the engine air intake butterfly valve 11, and by means of rod 12 to reduce the fuel supplied by injector pump 13 to that required for idling. Thus, when actuator is supplied with compressed air, the effect is to initiate an engine braking effect.

As alluded to above, the valve 5 is operated to allow air to pass from reservoir 6 to two-way valve 7 and thence to actuator 10 when the angular velocity sensor 2 detects rotation of the speedometer cable 1 commensurate with the maximum vehicle speed to be permitted. Thus, at the maximum speed the actuator closes the engine air and fuel supplies to prevent further acceleration.

Electropneumatic valve 5 acts to close line 8a or to admit compressed air from reservoir 6 to two way valve 7. Pedal valve 14 acts either to vent the two-way valve 7 to atmosphere, or to admit compressed air from reservoir 6 to two-way valve 7.

The two-way valve 7 is so arranged that, when neither electropneumatic valve 5 nor pedal valve 14 is admitting air to valve 7, valve 7 connects the actuator 10 to the vent of pedal valve 14. When electropneumatic valve 5 opens, valve 7 admits compressed air to actuator 10 and closes the communication with pedal valve 14 so that no air escapes and actuator 10 is operated. When pedal valve 14 is operated with electropneumatic valve 5 closed, air flows via two-way valve 7 to actuator 10, to close the vehicle throttle. As stated before, with both valves 7 and 14 closed, the actuator is vented to return control of the throttle setting to the driver using the conventional accelerator pedal 15.

In operation, electropneumatic valve 5 is held closed until power is supplied from the vehicle's battery 30 via relay 4. When a signal is emitted by the sensor 2, relay 4 is operated to connect the supply of power to valve 5 and the valve 5 then opens to admit compressed air to the actuator 10 via line 8a, two-way valve 7 and line 9.

Operation of the actuator 10 closes the throttle valve 11 and reduces fuel supply to the engine, as described above, and the vehicle's speed then decreases. When the vehicle's speed is again below the maximum permitted speed, sensor 2 ceases to emit output signals and relay 4 therefore closes, interrupting the power supply to the valve 5 once more.

Valve 5 then closes and actuator 10 is vented to atmosphere by two-way valve 7 and pedal valve 14, thus returning control of the vehicle's speed to the driver.

The electrical connections to the angular velocity sensor and electropneumatic valve 5 are made directly to the vehicle's battery 30, so that the speed limiting system is not rendered inoperative by disconnecting the ignition system of the vehicle. In this way the most used method of circumventing speed limiting devices, i.e., by turning off the vehicle ignition switch, is made inoperative against the present device.

According to a secondary aspect of the invention, a resilient compressible link 16 is provided between the accelerator pedal 15 and the remainder of the throttle linkage. In this way, the maximum force exertable on the linkage by the accelerator pedal 15 may be determined.

The compressible link is formed by a hollow cylinder 17 closed at one end 18, and a plunger 19 slidable in cylinder 17. A spring 20 is housed in the cylinder to act against end wall 18 and plunger 19. The spring 20 is in a state of compression, holding plunger 19 against a stop on the cylinder with a predetermined force, depending on the free length of the spring and its spring constant.

When the accelerator pedal is pressed and a compressive force is experienced by link rod 21, link rod 22 joined to plunger 19 will transmit the force to the remainder of the throttle linkage. If, however, the force exerted on link rod 21 is greater than the force due to the precompression of spring 20, then spring 20 will be further shortened and as a result the movement of accelerator pedal 15 will not be transmitted to the throttle linkage.

Clearly the system must be arranged so that when the accelerator pedal is fully depressed and the throttle valve 11 is closed by the actuator 10, the force exerted by the spring 20 is insufficient to overcome the action of actuator 10. Clearly the various forces are dependent on the geometry of the linkage, but their calculation should present no difficulty to one skilled in the art. Clearly a spring having a low spring constant and a high precompression load is desirable.

It will thus be apparent that an improved speed limiting device is provided by the teachings of the present invention in that the resistance of the device to tampering and misuse is enhanced.

I claim:

1. A speed limiter for vehicles, wherein at a predetermined speed the air and the fuel supplies to the vehicle's engine are reduced to prevent acceleration beyond said predetermined speed comprising an angular velocity sensor responsive to the rotation of the vehicle speedometer cable to emit an output signal when a predetermined angular velocity of said cable is exceeded, and to apply said signal to an electropneumatic valve which controls a supply of compressed air to an actuator, the sensor, valve and actuator being so arranged that when the sensor emits an output signal, the valve admits air to the actuator which acts on the vehicle throttle linkage to reduce air and fuel supplies to the engine, the sensor and valve being supplied with electricity directly from the vehicle's battery.

2. A speed limiter in accordance with claim 1, characterized in that the said valve is supplied with electricity via a relay connected to the said sensor in such a way that an output from the sensor interrupts the power supply to the valve, the valve being closed when power is connected and open when it is not.

3. A speed limiter in accordance with claim 1 or claim 2, characterized in that the sensor is associated with an adjustable electronic circuit allowing the vehicle speed at which an output signal is generated to be adjusted.

4. A device according to claim 3, characterized in that the vehicle throttle linkage includes an elastic link to prevent the speed limiter device being overridden.

5. A device according to claim 4, characterized in that the accelerator pedal is connected to the remainder of the linkage via an elastic strut comprising a cylinder containing a precompressed spring, one end of the spring abutting a closed end of the cylinder and the other end abutting a plunger slidable within the cylinder, the accelerator pedal being connected to the cylinder or the plunger and the remainder of the linkage being connected to the plunger or the cylinder, respectively.

6. A device according to either claim 1 or claim 2, characterized in that the vehicle throttle linkage includes an elastic link to prevent the speed limiter device being overridden.

7. A device according to claim 6, characterized in that the accelerator pedal is connected to the remainder of the linkage via an elastic strut comprising a cylinder containing a precompressed spring, one end of the spring abutting a closed end of the cylinder and the other end abutting a plunger slidable within the cylinder, the accelerator pedal being connected to the cylinder or the plunger and the remainder of the linkage being connected to the plunger or the cylinder, respectively.

8. A speed limiter as claimed in claim 1 wherein the actuator shuts off the exhaust outlet to cause an engine braking effect.

9. A speed limiter as claimed in claim 1 in combination with a tractor-trailer, said trailor having a trailor service brake wherein the actuator applies said service brake.

10. A speed limiter for a vehicle having an engine with fuel and an air intakes normally controlled by a driver's accelerator, comprising an angular velocity sensor for sensing the angular velocity of the vehicle speedometer cable and for generating an output electrical signal when the sensed angular velocity exceeds a predetermined level, an electrical relay having a pair of normally closed contacts and being responsive to the output electrical signal of said angular velocity sensor to open said contacts, an electropneumatic valve including a passage closeable by a valve member when an electrical current from one of said relay contacts is applied to said valve, an electrical power source connected to the other of said relay contacts, a compressed air source for supplying compressed air through said passage in said electropneumatic valve, an actuator adapted to close at least one of said fuel and air intakes of said engine when compressed air is supplied thereto from said passage of said electropneumatic valve, whereby at angular velocities below said predetermined level said angular velocity sensor applies no output signal to said relay so that the relay contacts remain closed such that current from said electrical power source maintains said electropneumatic valve closed allowing a driver to open the air and fuel intakes, but at angular velocities above said predetermined level said angular velocity sensor applies an output signal to said relay to open the contacts thereof, such that current from said electrical power source is cut off from said electropneumatic valve, thereby opening said valve and allowing compressed air from said compressed air source to pass through said passage and to actuate said actuator to close at least one of said fuel and air intakes of said engine and prevent the driver from causing the vehicle to exceed a speed corresponding to said predetermined angular velocity level.

11. A speed limiter as claimed in claim 10 wherein said predetermined level at which said angular velocity sensor generates an output electrical signal is adjustable.

12. A speed limiter as claimed in claim 10 wherein said driver's accelerator is connected to said intake by a throttle linkage which includes an elastic link to prevent the speed limiter from being overridden.

13. A speed limiter as claimed in claim 12 wherein said elastic link includes a cylinder containing a prestressed spring, one end of the spring abutting a closed end of the cylinder and the other end abutting a plunger slidable within the cylinder, the accelerator being connected to one of the cylinder or the plunger and the remainder of the linkage being connected to the other of the cylinder or the plunger.

* * * * *